Feb. 9, 1960 J. F. CYKLER ET AL 2,924,284
STONE HARVESTER
Filed Oct. 18, 1957 2 Sheets-Sheet 1
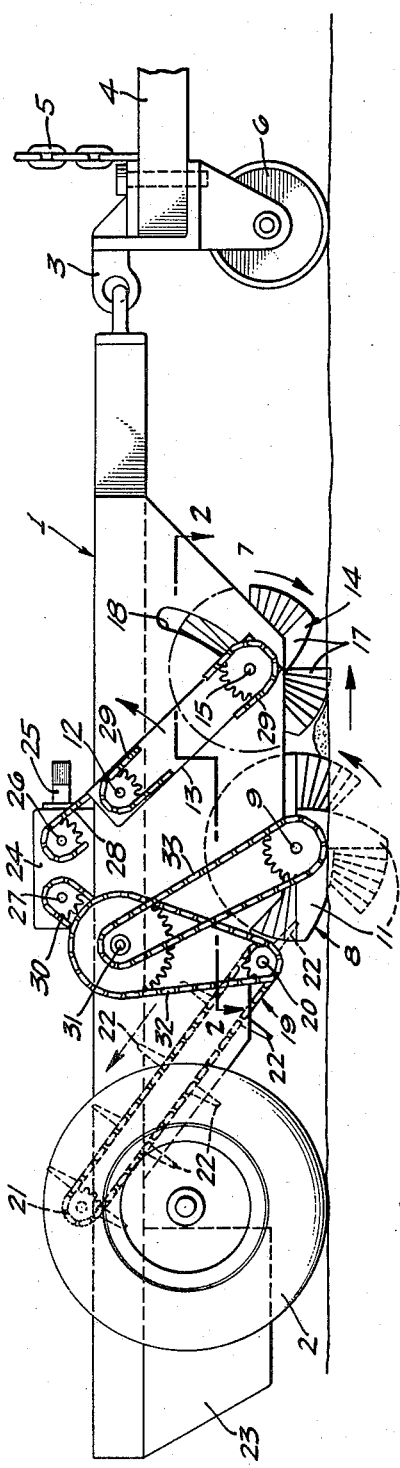
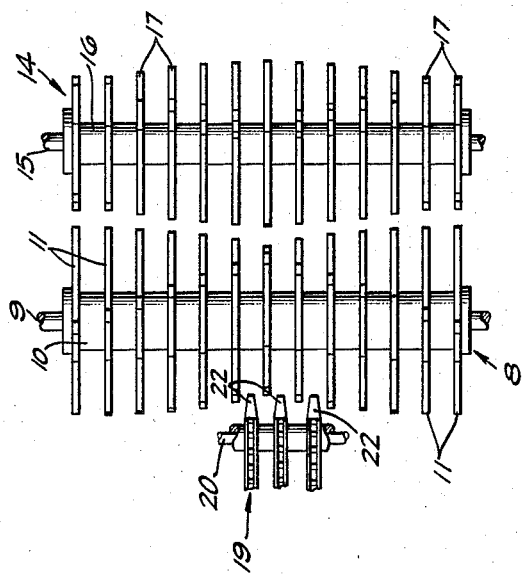
INVENTORS
JOHN F. CYKLER
ROY T. TRIBBLE
BY
*Lyon + Lyon*
ATTORNEYS

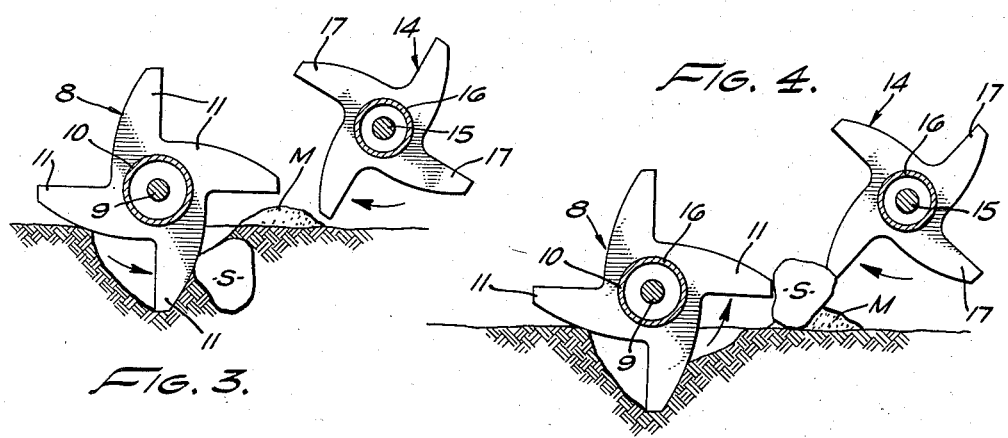
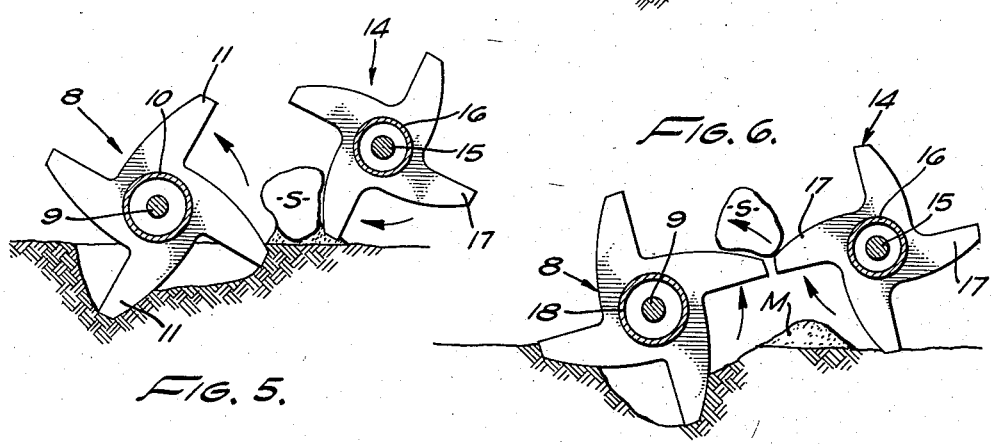
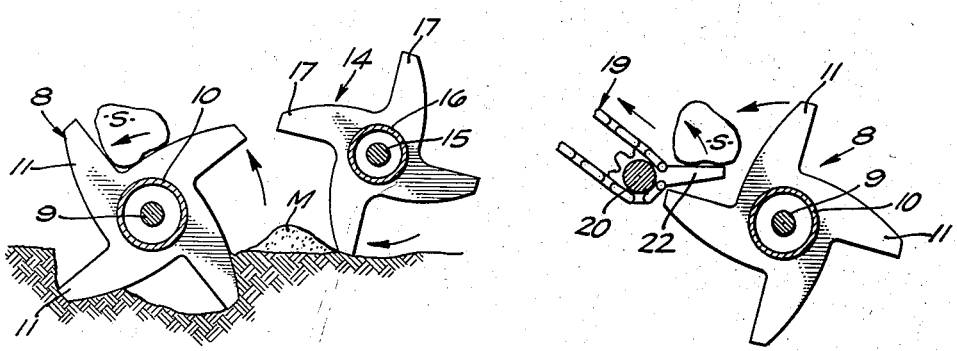

United States Patent Office 2,924,284
Patented Feb. 9, 1960

2,924,284
STONE HARVESTER

John F. Cykler and Roy T. Tribble, Honolulu, Hawaii, assignors to Pineapple Research Institute of Hawaii, Honolulu, Hawaii, a corporation of Hawaii Application October 18, 1957, Serial No. 690,923

5 Claims. (Cl. 171—63)

This invention relates to stone harvesters, and included in the objects of this invention are:

First, to provide a stone harvester which is arranged to dig a substantial depth into the ground and raise buried stones to the surface, and then lift the stones onto a conveyor for collection in a hopper or other container for transportation.

Second, to provide a stone harvester which incorporates a pair of novelly arranged coacting rotors having stone-handling blades so arranged that the blades of one rotor, as they travel under their common axis, dig into and raise stones to the surface of the ground, whereupon the blades of the second rotor return the stones to the blades of the first rotor as they pass over their common axis so that the stones may be transferred to a conveyor for removal.

With the above and other objects in view, as may appear hereinafter, reference is directed to the accompanying drawings in which:

Figure 1 is a side view of a stone harvester;

Figure 2 is a fragmentary sectional view taken through 2—2 of Figure 1, showing particularly the lifting rotor, floating rotor, and conveyor in their operative relation but omitting the drive means and frame work;

Figures 3, 4, 5, 6, and 7 are diagrammatical, transverse, sectional views taken in a plane parallel with Figure 1 and illustrating the sequence of operation whereby a submerged stone is removed from the ground and lifted onto the conveyor;

Figure 8 is a similar diagrammatical view, illustrating the transfer of a stone from the lifting rotor to the conveyor.

The stone harvester includes a frame structure 1 supported at its rear end by a pair of wheels 2. The forward end of the frame structure 1 is connected by a hitch 3 to a beam 4 suitably connected to a tractor, not shown. The beam 4 is capable of being raised by means, not shown, which is joined to a chain 5. The beam 4 may be supported when in its lower position by a depth-limiting wheel 6.

The frame structure 1 includes suitably reinforced side plates 7. A lifting rotor 8 including a shaft 9 is rotatably supported under the side plates 7 and positioned transversely.

The lifting rotor 8 includes a relatively massive hub structure 10 from which extend a plurality of radiating blades 11. The blades are preferably arranged in sets of 4 axially spaced from each other. The blades in each set are disposed 90° relative to each other. Also the blades of adjacent sets are preferably displaced circumferentially in such a manner that the blades at the axial extremity of the rotor lead the blades at the center of the rotor. The lifting rotor is intended to be rotated in opposition to the direction of travel of the stone harvester. That is, the blades passing under the hub structure 10 move forwardly as indicated by the arrow in Figure 1.

Extending outwardly from the frame structure 1 is a pair of fulcrum shafts 12 which support the upper end of a pair of arm members 13. The arm members extend downwardly and forwardly along the outer sides of the side plates 7 and support therebetween a floating rotor 14 mounted on a shaft 15. The floating rotor is constructed substantially identical to the lifting rotor 8 except that it may be slightly smaller in diameter. That is, the floating rotor 14 includes a hub structure 16 from which extends sets of radiating blades 17. There are preferably four blades in each set, and the sets of blades are spaced axially so that the blades 17 are in substantial alignment with the blades 11. The floating rotor is intended to rotate in a direction opposite from the lifting rotor. That is, the blades 17 move rearwardly as they pass under the hub structure 16, as indicated by the arrow in Figure 1. The sets of blades at the axial extremities of the hub structure 16 preferably lead the set of blades at the center thereof.

The side plates 7 are provided with arcuate slots 18 which permit arcuate movement of the floating rotor 14 about the axis of the fulcrum shaft 12. The slots 18 limit downward and rearward movement of the floating rotor 14 so that the floating rotor may confront the lifting rotor 8 but does not engage or intermesh therewith.

Disposed rearwardly of the lifting rotor 8 is a conveyor structure 19 which includes a lower shaft 20 contiguous to the lifting rotor 8 and an upper shaft 21 located above the frame. The conveyor structure 19 may include a plurality of sprockets mounted on the shafts 20 and 21 connected by chains on which are mounted a plurality of upstanding fingers 22. The fingers 22 are arranged to pass between the blades of the lifting rotor 8. The upper end of the conveyor structure 19 discharges into a hopper or other container 23 mounted at the rear end of the frame structure 1.

Mounted on the frame structure 1 is a gear box 24 having a power input shaft 25 which may be suitably connected to the conventional power take-off of a tractor employed to pull the stone harvester, or may be connected to an auxiliary engine mounted on the frame structure 1, but not shown.

The gear box 24 is provided with a pair of output shafts 26 and 27. The output shaft 26 is connected through a transfer drive 28 to one of the fulcrum shafts 12, and this fulcrum shaft 12 is connected by a drive 29 with the shaft 15 of the floating rotor 14. The output shaft 27 is connected by a transfer drive 30 to a countershaft 31. The countershaft 31 is connected by a drive 32 to the conveyor structure 19 and by a drive 33 to the lifting rotor 8. Sprocket and chain drives are preferably employed, and the time is preferably so arranged that the tip speeds of the lifting rotor blades 11 and the floating rotor blades 17 are approximately equal. The conveyor speed is preferably such that approximately six sets of fingers 22 move between the blades 11 of the lifting rotor 8 with each rotation of the lifting rotor.

It will be observed that the blades of both the lifting rotor 8 and the floating rotor 14 are so arranged that their leading edges curve backwardly with respect to the direction of travel of the rotors.

Operation of the stone harvester is as follows:

When the stone harvester is in operation the frame structure 1 is lowered so that the blades 11 of the lifting rotor 8 penetrate the ground, and, in fact, may penetrate until the frame structure is virtually resting on the hub structure 10. By reason of the fact that the blades 11 rotate forwardly as they pass under the hub structure 10, any stones, such as the stone S, is forced forwardly and upwardly out of the ground. Not only are stones lifted by the rotor, but the blades 11 plow the ground and tend to maintain a traveling mount M of loose dirt forwardly of the lifting rotor. The stones move up through and tend to rest on the loose mound of earth until engaged by the blades 17 of the floating rotor 14. If, as shown in Fig. 4, a blade of the floating rotor should engage the stone so that the stone is wedged between the blades of the two rotors, the floating rotor 14 merely swings upwardly and forwardly. If this occurs, succeeding blades engage the stone and urge the stone upwardly and rearwardly onto the corresponding blade or blades 11 of the lifting rotor 8, as shown in Figs. 5 and 6. The stone is urged onto the lifting rotor with sufficient momentum that it readily cradles between adjacent blades as the blades pass over the hub structure 16 in a rearward direction, as shown in Fig. 7. The stone is then lifted from the blades 11 by the fingers 22 of the conveyor structure 19 and conveyed to the hopper 23.

By reason of the fact that the axially outer set of blades lead the central blades of the lifting rotor 8 as well as the floating rotor 14, the stones tend to be worked or tumbled towards the central portion of the rotors. Also by reason of the circumferentially offset relation of the blades, the driving load is maintained substantially uniform. The amount of circumferential offset between the sets of blades may not be such as to fill the 90° spacing between adjacent blades, for in the operation of the lifting rotor two blades are at all times in engagement with the ground.

The lifting rotor 8 not only removes the stones from the ground, but also thoroughly cultivates the ground.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A stone harvester, comprising: a frame structure; supporting wheels at the rear end thereof; a hitch at the forward end thereof; a lifting rotor including a hub and a plurality of axially spaced, ground-penetrating blades, said lifting rotor being suspended transversely under said frame thereby to engage and lift stones to the surface of the ground; drive means for said lifting rotor, said drive means being carried by said frame structure and rotating said lifting rotor in a direction to cause said ground-penetrating blades to move, as they pass under said hub, in a forward direction relative to said frame structure; a floating rotor including a plurality of axially spaced blades; suspension means for said floating rotor, said means being pivotally connected to said frame structure and disposing said floating rotor forwardly of said lifting rotor, said floating rotor being urged by gravity toward said lifting rotor; said floating rotor blades being engageable with the stones lifted by said lifting rotor blades to urge said stones onto said lifting rotor blades as they pass over said lifting rotor hub; and means cooperatively associated with said lifting rotor for removing the stones from the upper side of said lifting rotor.

2. A stone harvester, comprising: a frame structure; supporting wheels at the rear end of said frame structure; a lifting rotor including a hub and a plurality of axially spaced, ground-penetrating blades, said lifting rotor being suspended transversely under said frame thereby to engage and lift stones to the surface of the ground; drive means for said lifting rotor, said drive means being carried by said frame structure and rotating said lifting rotor in a direction to cause said ground-penetrating blades to move, as they pass under said hub, in a forward direction relative to said frame structure; a floating rotor including a plurality of axially spaced blades; suspension means for said floating rotor, said means being connected to said frame structure and disposing said floating rotor forwardly of said lifting rotor; said floating rotor being urged by gravity toward said lifting rotor; said floating rotor blades being engageable with stones to urge said stones onto said lifting rotor blades as they pass over said lifting rotor hub.

3. The apparatus of claim 2 including means cooperatively associated with said lifting rotor for removing the stones from the upper side of said lifting rotor.

4. The apparatus of claim 2 wherein a conveyor is supported by said frame structure and extends upwardly and rearwardly from said lifting rotor, said conveyor having fingers movable between the lifting rotor blades to remove the stones therefrom.

5. The apparatus of claim 2 wherein said drive means are connected to both rotors and rotates said rotors in unison in opposite directions.

References Cited in the file of this patent

UNITED STATES PATENTS

| | | |
|---|---|---|
| 1,047,262 | Matejowitz | Dec. 17, 1912 |
| 1,542,670 | Cote | June 16, 1925 |
| 1,747,139 | Mourar | Feb. 11, 1930 |
| 1,778,920 | Swanson | Oct. 21, 1930 |
| 1,850,357 | Pitcher | Mar. 22, 1932 |
| 2,523,024 | Jenkins | Sept. 19, 1950 |
| 2,652,673 | Zehren | Sept. 22, 1953 |